United States Patent [19]
Hutchison et al.

[11] Patent Number: 5,314,230
[45] Date of Patent: May 24, 1994

[54] MONOCOQUE BODY ASSEMBLY

[75] Inventors: Wayne R. Hutchison, Mayville; Richard D. Teal, Horicon, both of Wis.; Steven C. Wasson, Midland, Mich.; Mansour Mirdamadi, Midland, Mich.; Earl T. Moore, Midland, Mich.; Luis Lorenzo, Midland, Mich.; Michael J. Coffey, Midland, Mich.; Daniel R. Nickles, Monroe, N.Y.

[73] Assignee: Deere & Company, Moline, Ill.

[21] Appl. No.: 8,252

[22] Filed: Jan. 25, 1993

Related U.S. Application Data

[63] Continuation of Ser. No. 715,204, Jun. 14, 1991, abandoned.

[51] Int. Cl.$^5$ .................. B62D 23/00; A01D 67/00
[52] U.S. Cl. .................. 296/203; 296/197; 296/204; 296/29; 296/35.1; 296/901; 180/89.1; 180/311; 56/320.1
[58] Field of Search .................. 296/35.1, 35.3, 29, 296/196, 197, 203, 204, 901, 185; 180/311, 89.1; 280/771, 779; 56/14.7, 320.1, 320.2

[56] References Cited

U.S. PATENT DOCUMENTS

| D. 311,921 | 11/1990 | Popelier et al. | D15/15 |
|---|---|---|---|
| 2,242,269 | 5/1941 | Siebler | 296/901 X |
| 2,326,952 | 8/1943 | Komenda | 296/185 |
| 2,330,595 | 9/1943 | Komenda | 296/29 X |
| 2,880,032 | 3/1959 | Barenyi | 296/185 |
| 3,502,346 | 3/1970 | Cadiou | 280/779 |
| 3,550,948 | 12/1970 | Thompson, Jr. | 296/185 |
| 4,730,870 | 3/1988 | De Rees | 296/197 |
| 4,842,326 | 6/1989 | DiVito | 296/35.3 X |
| 4,917,435 | 4/1990 | Bonnett et al. | 296/197 X |
| 4,978,164 | 12/1990 | Nakamura et al. | 296/197 |
| 5,129,700 | 7/1992 | Trevisan et al. | 296/196 |

FOREIGN PATENT DOCUMENTS

| 160904 | 8/1943 | Fed. Rep. of Germany | 296/901 |
|---|---|---|---|
| 1134617 | 8/1962 | Fed. Rep. of Germany . | |
| 1184652 | 12/1964 | Fed. Rep. of Germany | 296/29 |
| 3011428 | 10/1981 | Fed. Rep. of Germany . | |
| 0851400 | 1/1940 | France | 296/901 |
| 87/04679 | 8/1987 | PCT Int'l Appl. | 296/203 |
| 1209714 | 10/1970 | United Kingdom | 296/901 |
| 1253202 | 11/1971 | United Kingdom . | |
| 2168295 | 6/1986 | United Kingdom | 296/35.3 |

OTHER PUBLICATIONS

Preliminary Feasibility Study previously identified as "AR", containing information generated and produced by employees of The Dow Chemical Co. and Deere & Co., pages numbered 1-205 inclusive, co-generated prior to Sep. 1, 1989 and confidentially shared between The Dow Chemical Co. and Deere & Co. in the U.S.A.
Deere & Company, *John Deere Riding Mowers*, 8 pages, 1990, published in U.S.A.
Private correspondence from Eagle-Picher to a Deere & Company employee in the U.S.A., including two pages of drawings and letter, 5 pages, Mar. 18, 1987.
Deere & Company, *John Deere Telerobotics, vehicle illustrations*, 4 pages, published in U.S.A. prior to 1990.
General Electric Co., *Systems for Automated Manufacture*, 8 pages, date unknown, published in U.S.A.
Carron & Company, Inkster, Mich., article entitled *All-Plastic Concept Car*, 3 pages, Jul. 1987, published in U.S.A.
A. A. Adams of Lotus Car article entitled *Reinforced Plastic Composites in the Specialized Automotive and Other Industries*, 4 pages, Mar. 1987, published in U.S.A.

Primary Examiner—Dennis H. Pedder

[57] ABSTRACT

Structure is provided for joining and bonding together two halves of a plastic upper body member which in turn are joined and bonded to a fiber reinforced lower member to comprise a monocoque vehicle assembly. The joint designs facilitate side-to-side and fore-and-aft alignment for quick and easy assembly of the upper body member to the lower member. Spacer surfaces are provided for controlling adhesive reservoirs between adjoining surfaces to facilitate positive bonding.

37 Claims, 5 Drawing Sheets

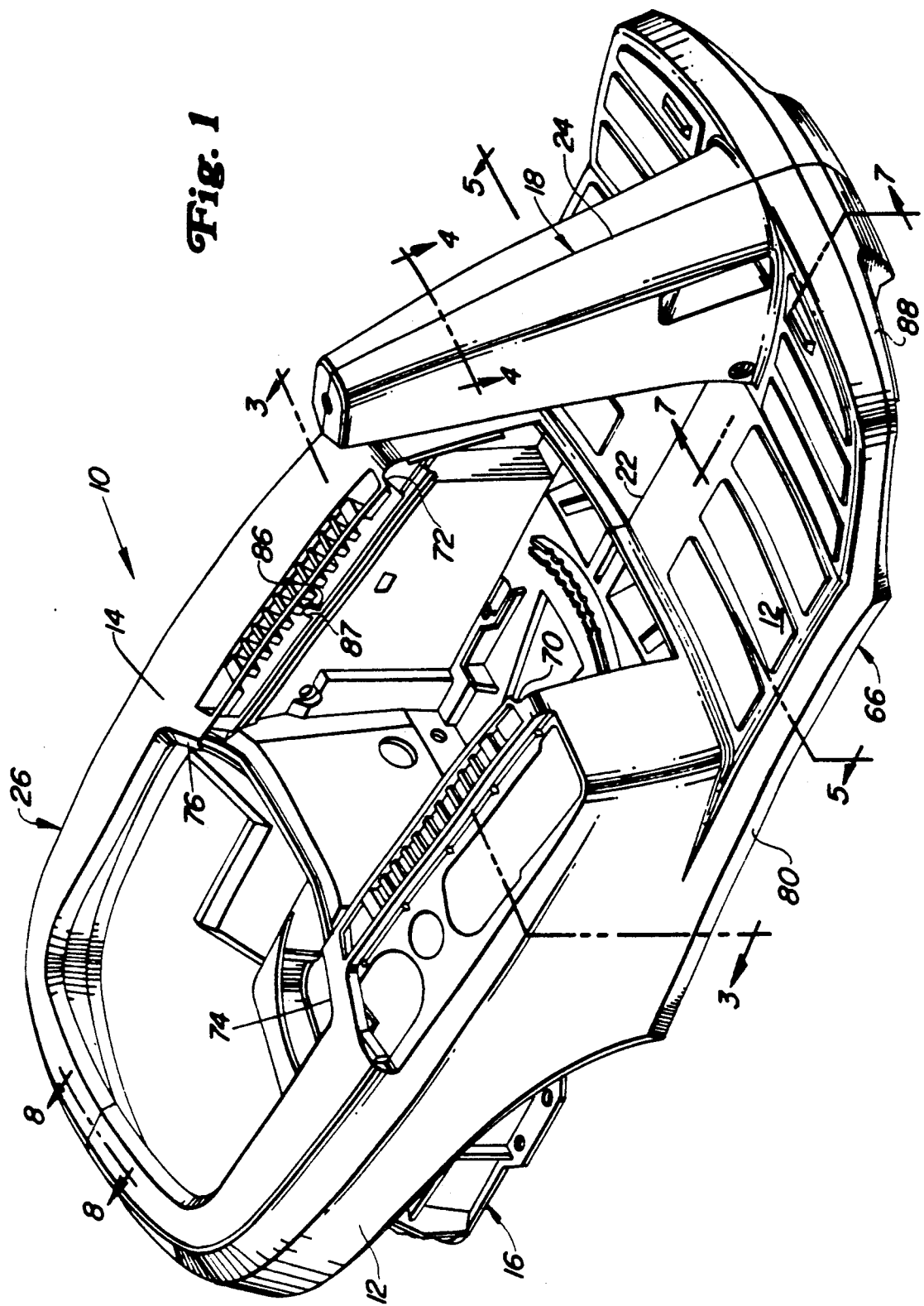

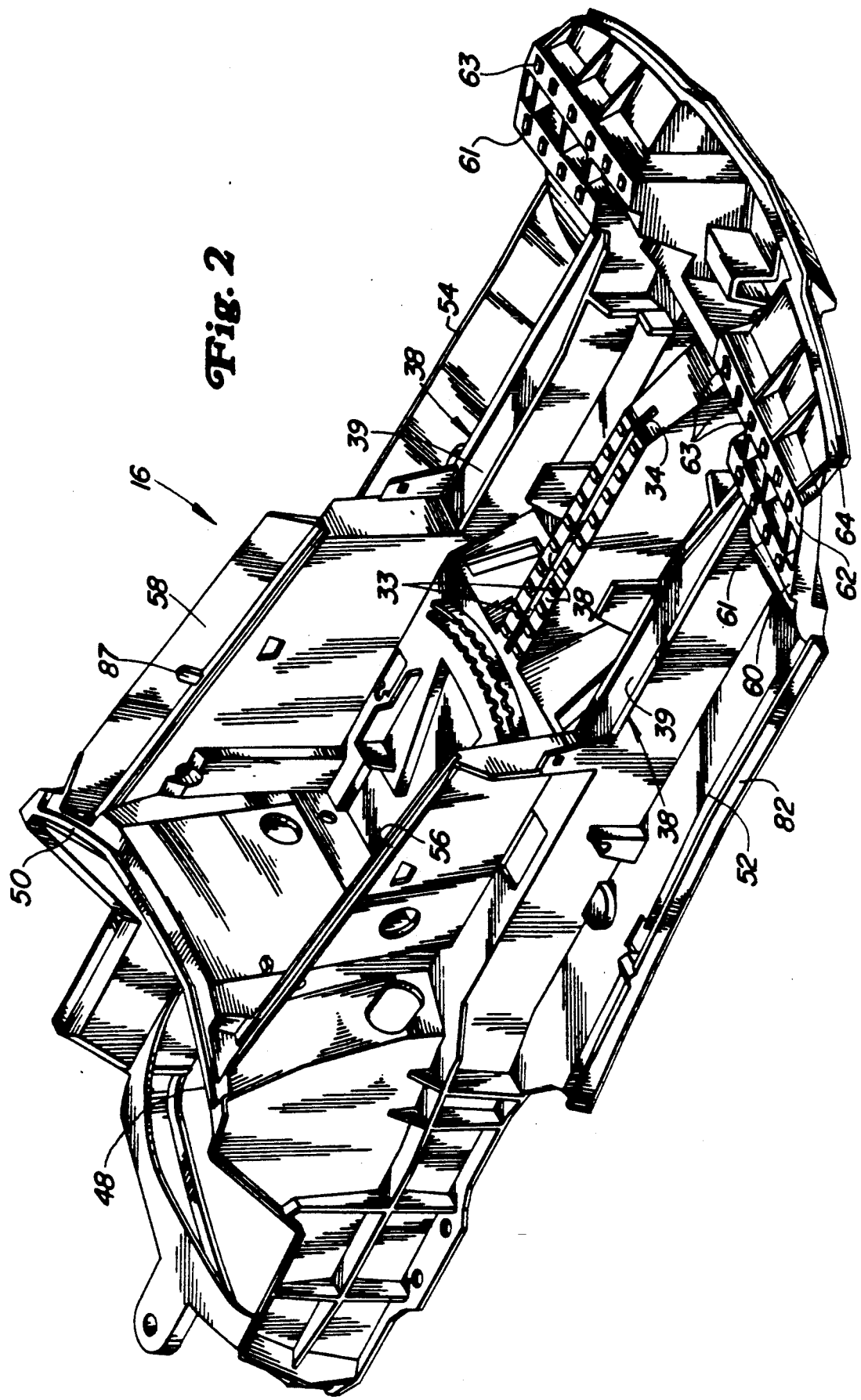

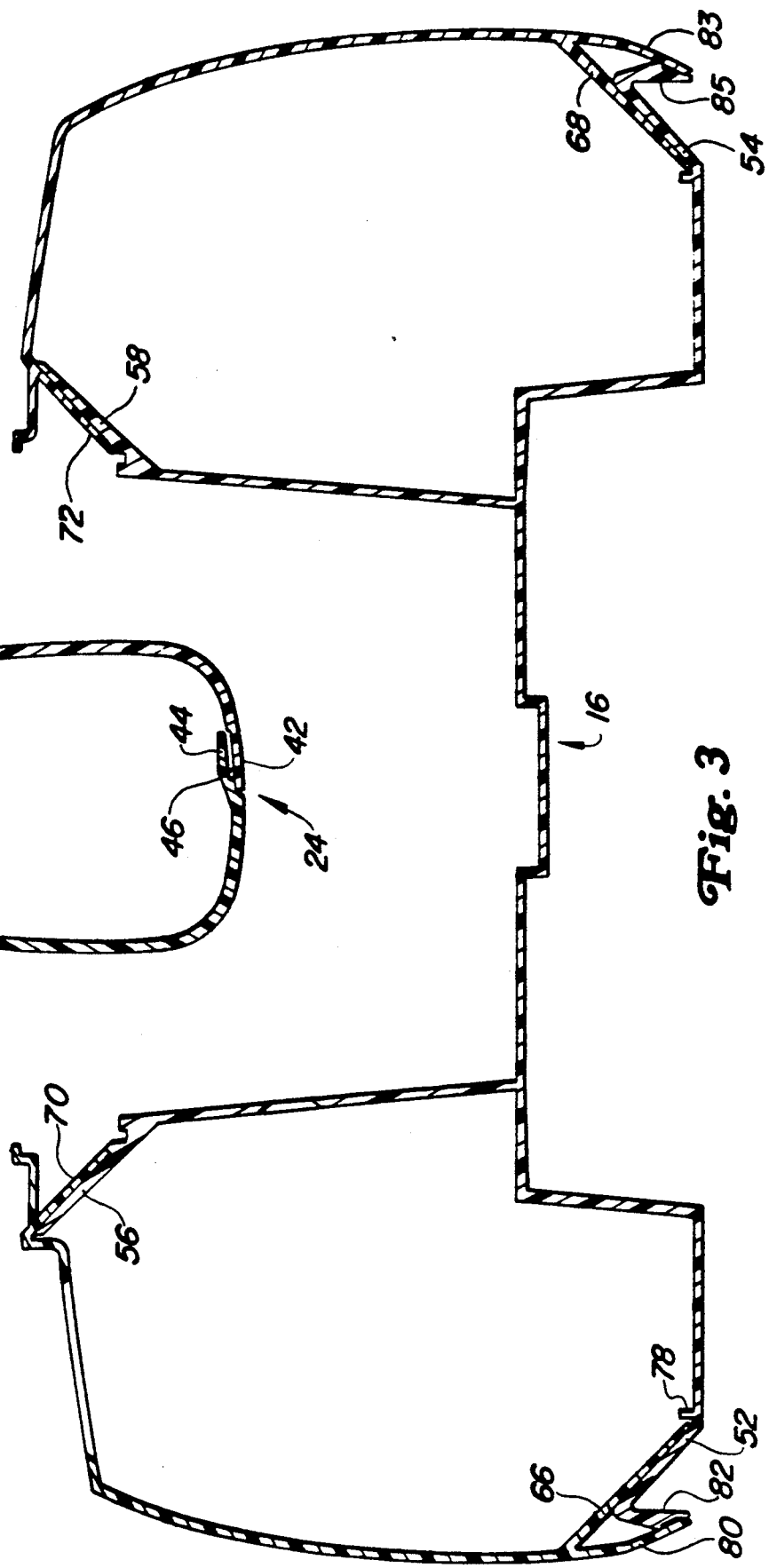

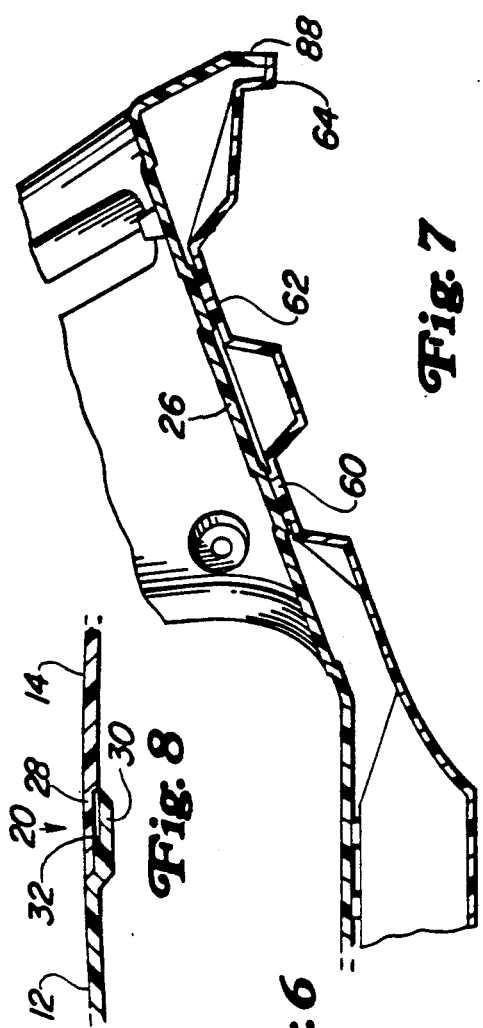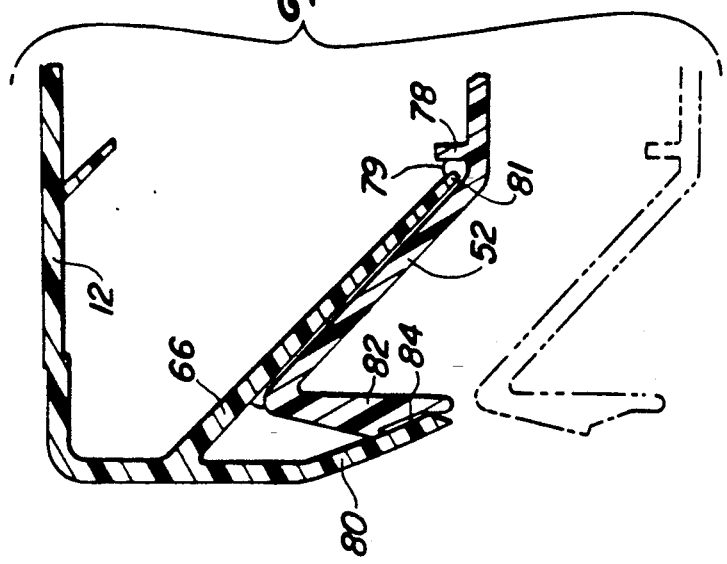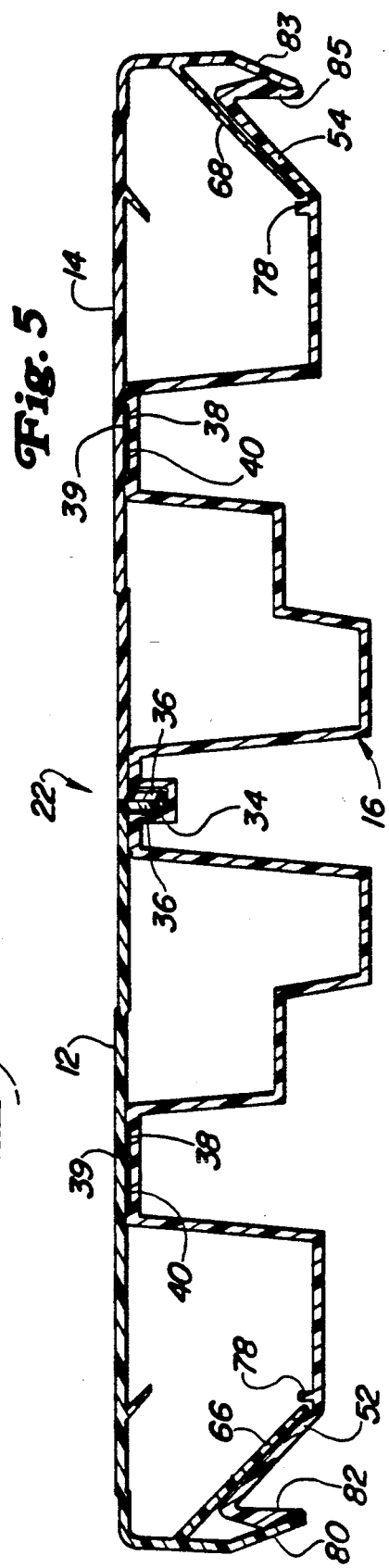

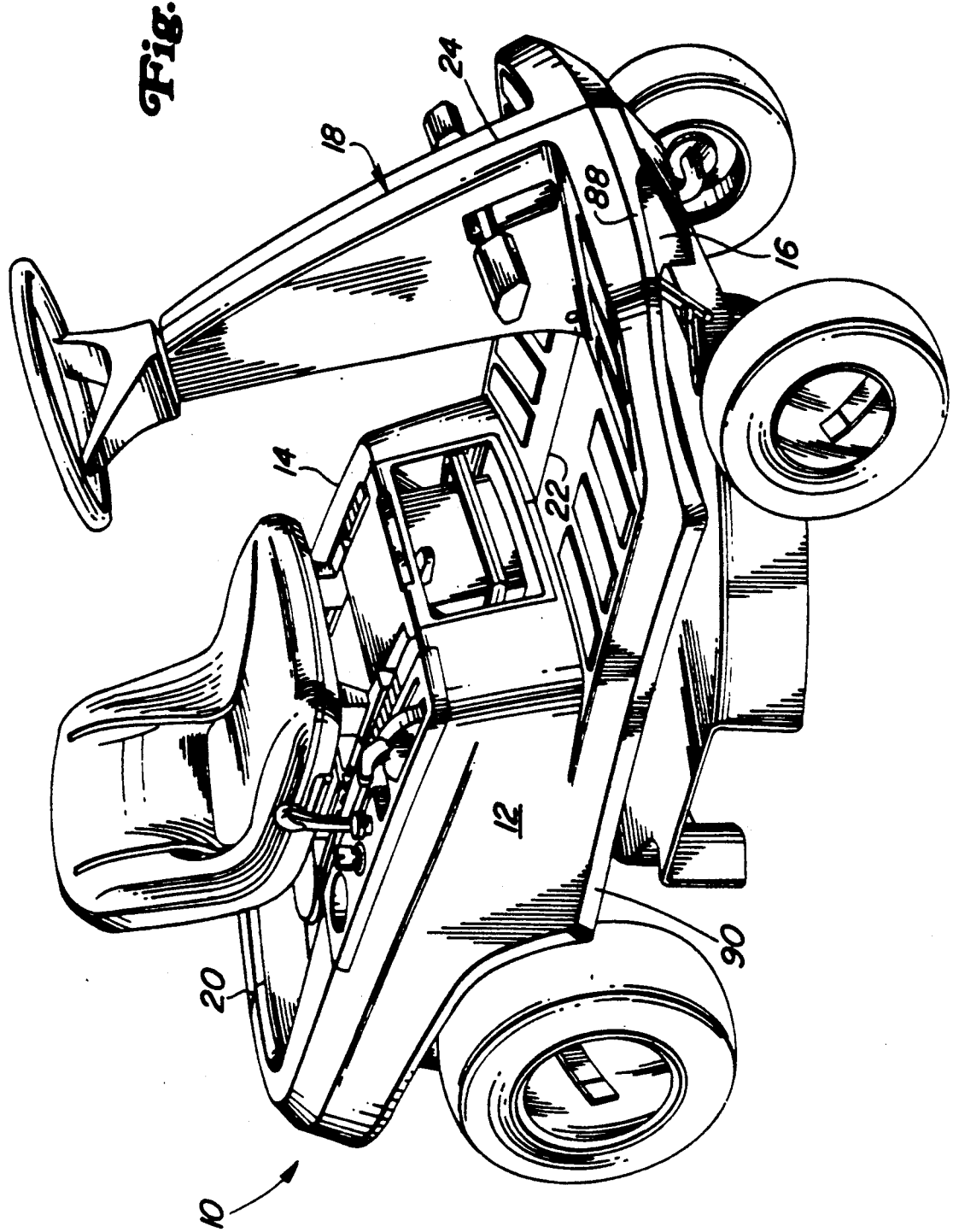

MONOCOQUE BODY ASSEMBLY

This application is a continuation of application Ser. No. 07/715,204, filed Jun. 14, 1991, now abandoned.

BACKGROUND OF THE INVENTION

1. Field of the Invention

The present invention relates to lower and upper body structures for a vehicle, and more specifically to a three-piece monocoque body assembly for use in small vehicles, such as lawn and garden tractors.

2. Description of the Related Art

Lawn and garden ride-on vehicles utilize a main frame that is typically manufactured from many individual pieces. Those pieces have traditionally been made of metal to withstand the various loads and deflections encountered by the vehicle. The pieces are either cut and/or stamped and then welded or bolted together. Subsequently, some type of body enclosure is attached to the main frame to cover the mechanical components, such as the engine, wheels, control linkages and battery.

The expenses associated with the materials, and the manufacturing and assembly operations in producing vehicle frames and bodies is substantial and, therefore, some manufacturers have utilized alternative materials, including fiber reinforced plastics.

To obtain the stiffness needed to withstand the types of loads and deflections associated with vehicle operation, metal frame members have been used as skeletal supports with the plastic panels which may be bonded together then being bolted to the metal members. Subsequently, other plastic panels are bolted or bonded to the first panels to complete the vehicle and its body structure.

Some fiber reinforced plastic vehicle bodies have also been made without the use of a metal skeletal structure. Accordingly, the panels are relatively rigid and bonding of the panels into a vehicle structure requires tight tolerances and careful assembly procedures to assure that the bonded joints have the desired dimensions and appropriate strength.

SUMMARY OF THE INVENTION

It would therefore be desirable to provide a plastic-type upper and lower body vehicle assembly which does not necessarily require metal skeletal members, yet one which has the resiliency and durability to withstand the loads encountered by a vehicle, such as a lawn and garden tractor.

It would additionally be desirable to provide a multi-piece plastic-type upper and lower body having parts which can quickly and positively be positioned with respect to one another during assembly operations. Further, the tolerances required for adhesive gaps at the bonding joints should be maintained to assure that the joint develops the desired strength and that the joints can accommodate differential thermal and moisture expansion and contraction of the plastic parts.

Towards these goals, there is provided a plastic-type vehicle assembly which includes a top body structure made from plastic without reinforcing fibers, this body shell or top member being assembled from left and right section halves.

The assembly further includes a lower member produced from fiber reinforced plastic. The assembled monocoque structure provides the rigidity necessary to carry the loads encountered by the vehicle.

The structural joints between the upper and lower members and between the two halves of the upper body member creates the monocoque body. Vehicle loads are carried throughout the skin of the body. The bond joints therefore are essential in continuously transferring the loads among body elements and are essential to avoid the stress concentrations that originate at mechanically fastened joints.

A bonding joint design is provided between the upper and lower members that enables them to be quickly and easily assembled. The joints are configured to positively align and locate the upper member halves relative to the lower member as they are assembled, then snap into place and lock them together to positively provide the appropriate adhesive gap between mating surfaces for bonding the two parts together. The upper plastic body structure is further able to flex as it is joined to the lower member without incurring fractures, cracks or other damage, thereby allowing its joint members to snap into place with the lower member joints.

The joint designs also provide an adhesive gap dimension that can be maintained at the desired configuration to accommodate differential thermal and moisture expansion and contraction of the bonded assembly of plastic materials with dissimilar coefficients of thermal and moisture expansion.

BRIEF DESCRIPTION OF THE DRAWINGS

FIG. 1 illustrates the monocoque body assembly with the two upper body portions assembled to the lower structure.

FIG. 2 illustrates the lower structure.

FIG. 3 is a view taken along lines 3—3 of FIG. 1 and illustrates the upper and lower joints between the upper and lower members.

FIG. 4 is a view taken along lines 4—4 of FIG. 1 and illustrates the two joints in the hollow steering column enclosure formed between the left and right upper body portions.

FIG. 5 is a view taken along lines 5—5 of FIG. 1 and illustrates the joints in the center and forward portion of the body assembly.

FIG. 6 is an enlarged view of the left end portion of FIG. 5 and illustrates in detail the bonding joint between the upper and lower members.

FIG. 7 is a view taken along lines 7—7 of FIG. 1 and illustrates the forwardly located and laterally extending joints between the upper and lower structures.

FIG. 8 is a view taken along lines 8—8 of FIG. 1 and illustrates the rear joint between the two upper body portions.

FIG. 9 is a front right perspective view of a lawn and garden vehicle utilizing the monocoque body assembly.

DESCRIPTION OF THE PREFERRED EMBODIMENT

Looking first to FIGS. 1 and 2, it will be seen that the monocoque vehicle assembly 10 is comprised of three parts. Two of these parts are joined to form the upper structure and include similar left and right body portions or halves, designated 12 and 14. The third part is the lower frame structure 16, best illustrated in FIG. 2. The structure and manner of joining these three members 12, 14 and 16 to form a monocoque vehicle assembly 10 comprises the subject of this invention.

Returning now to FIG. 1, it will be noted that the upper body portions 12 and 14 include a fore-and-aft extending seam or joint along which they are bonded.

This bonding joint is designated 18 in FIG. 9. FIGS. 8, 5 and 4 illustrate respectively the rear, center and forward joints 20, 22 and 24 between the two body portions 12 and 14.

Looking first at FIG. 8, it will be noted that the rear sections of the upper body structure or member 26 are joined by overlapping members including a first flap or tab, designated 28, carried by the right body portion 14. The second flap or tab, designated 30, is carried by the left body portion 12. A satisfactory adhesive gap 32 is provided between the two tabs 28 and 30 to allow the desired amount of adhesive for joining the portions 12 and 14 and for allowing differential thermal and moisture expansion and contraction of the plastic portions 12 and 14. Spacer bumps similar to those bumps 33 (see FIG. 2) located along the forward center joint 22 are included between the tabs 28–30 to provide the desired adhesive reservoirs between them.

Looking now to FIG. 5, there is illustrated the center joint 22 between the two body halves 12 and 14 and the U-shaped channel 34 formed in the lower member 16. Prior to inserting the legs or leg portions 36 of the L-shaped edges of the upper body halves 12 and 14 into the channel 34, adhesive would be applied to their adjacent vertical surfaces and the channel 34. This joint 22 assists in locking the upper body member 26 and lower frame members 16 against side-to-side movement.

The four fore-and-aft extending surfaces 38 of the lower member 16 will also receive adhesive and therefore bond to the lower corresponding and center surface 40 of the assembled upper body 26 (see FIGS. 2 and 5). The two center fore-and-aft surfaces 38 will also include the spacer bumps 33 which when joined with the upper body 26 serve to provide adhesive reservoirs that define the amount of adhesive contained in the joint. The outer two surfaces 38 preferably include fore-and-aft extending U-shaped channels 39 that serve as adhesive reservoirs to control the adhesive bead retained between those surfaces 38–40.

The forward joint 24 between the steering column halves would come together into a steering column structure as illustrated in FIGS. 1 and 4. This joint includes overlapping and abutting tab structures or surfaces 42 and 44 which are also provided with a gap 46 therebetween for receiving the appropriate amount of adhesive to permanently secure them together. Spacer bumps could also be provided in this joint if desired.

Looking again to FIG. 2, the lower member surfaces which would be bonded to the upper member body 26 include the rearwardly located and generally laterally extending upper surfaces 48 and 50, the fore-and-aft, left and right running board-type surfaces, designated 52 and 54, the upper, generally vertical, fore-and-aft extending operator area surfaces designated 56 and 58, the fore-and-aft extending center U-shaped channel area designated 34, the fore-and-aft extending surfaces 38, and the forwardly located and transversely extending surfaces designated 60, 62 and 64. These surfaces 60-62 would also include spacer bumps 61-63 (FIG. 2) that serve to regulate the adhesive between the mating surfaces of the upper and lower members 26-16.

To join the body portions 12 and 14, a fixture can be provided wherein adhesive is applied and the portions are held together until the joints 20, 22 and 24 bond. U-shaped clips may be of assistance in positioning and securing the legs 36 together if desired. Once the rear, center and steering column joints 20, 22 and 24 have been bonded, the body 26 is positioned for receiving the lower member 16 illustrated in FIG. 2. While various assembly techniques can be utilized to position the upper structure 26 within the lower structure 16, one believed satisfactory is to invert the upper structure 26 and provide the adhesive beads along the appropriate joint surfaces of the upper member 26 in anticipation of positioning the lower member 16 therein.

The procedure for quickly and easily assembling the upper body 26 and lower member 16 follows. Assuming that the upper member 26 is inverted and that the lower member 16 is lowered therein, beads of adhesive would be placed along the body surfaces that would be joined with the lower member 16. Those body surfaces would include the left and right lower fore-and-aft extending edge surfaces 66 and 68 and the left and right, generally vertical, upper fore-and-aft extending operator surfaces 70 and 72 (best shown in FIG. 3). Further, body surfaces receiving adhesive would include the vertical edges of the fore-and-aft extending center leg surfaces 36 (FIG. 5), the left and right laterally extending upper surfaces 74 and 76 (FIG. 1), the fore-and-aft extending forward surface 40 (FIG. 5) and the laterally extending forwardly located first, second and third surfaces 60, 62 and 64 (FIG. 2).

Subsequently, the lower member 16 would be inverted and lowered into the upside down upper body 26 held in a fixture. As the lower member 16 is lowered, the left and right fore-and-aft extending upper and lower guide surfaces 52–54 and 56–58 respectively of the lower member 16 contact their respective complementary joint follower surfaces 66–68 and 70–72 of the upper body 26 and slidingly move therealong (see FIG. 3). Simultaneously, the vertical and laterally extending rear surfaces 48–50 of the lower member 16 slidingly contact the body surfaces and the legs 36 begin to seat into the U-shaped channel 34. As the pairs of fore-and-aft extending guide and follower surfaces 52–66, 54–68, 56–70 and 58–72 come together, they will be snapped or locked in place. Since the spaced apart pairs of fore-and-aft extending surfaces 52–66 and 54–68 have essentially identical bonding surface configurations, only the enlarged view illustrated in FIG. 6 need be discussed in detail.

As the surfaces 52 and 66 (or 54 and 68) slidingly contact, movement of the upper body surface 66 may be limited as its end portion by the stop means or dam 78. As the surfaces or legs 52 and 66 of the V-shaped upper body structures 66–80, 68–83 and V-shaped lower body structures 52–82, 54–85 engage and the lower member 16 continues to be lowered, the resilient or flexible locking members 80 become engaged with their respective latching or locking shoulder member 82 and the resilient locking or hook member 80 flexes outwardly with the end thereof snapping or locking into the recess 84 provided in the shoulder member 82. Because the snap joint parts and in the preferred embodiment the upper body 26 and snap joint parts are plastic, they can flex without incurring cracking or fracturing as the V-shaped guide means 80–66 of the body member and means 82–52 of the frame member position and align the upper body member 26 with the lower frame member 16 (see FIGS. 5–16).

The recess 84 in shoulder 82 also serves to retain a designated amount of adhesive to bond them together. In the preferred embodiment, the gap provided between all the surfaces, except 64–88 (FIG. 7), is approximately 30/1000 once the parts are locked into place. Similarly, an adhesive bead will be applied to the surfaces 52-66 and, as they slidingly engage, adhesive will be squeezed outwardly towards the edge and fill the space or area between the edge of 66 and the dam 78 (see FIG. 6). This bead of adhesive 79 will then flow around the end 81 of flap 66 and over it to seal it against the tendency for it to peel loose. The adhesive bead 79 will seal the end of the flap 66 and help insure that the higher forces necessary to shear the bond joint at the end 79 of flap 66 be exceeded before any peeling of the flap 66 can occur.

While the fore-and-aft pairs of surfaces are being joined, the notch 87 and slot 86 and upper rear surfaces 48-50 assist in positioning and locking the upper body 26 and lower member 12 in the fore-and-aft direction (see FIG. 1 and 2) and the laterally extending upper body and lower member surfaces 60, 62 and 64 come into contact with the front portion of the upper body 26. Looking to FIG. 7, there is shown the transverse edge of ledge 64 which mates with transverse lip 88 of the upper member to position the two members 26-16 in a vertical orientation and lock them fore and aft. To limit downwardly movement of the lower member 16 into the upper body 26, the forwardly extending surfaces 38 and 40 and transverse lip 88 contact and are bonded.

From the foregoing, it can be seen that there is provided a monocoque assembly structure that can quickly, easily and positively be joined and fixed together, yet retain the bonded joint configurations required to enable the structural elements to appropriately transfer loads and to expand or contract as temperature and moisture variations occur.

We claim:

1. Means for positioning and joining a plastic upper body member with a plastic lower frame member to form a monocoque vehicle assembly, said members including mid and edge portions, the means including first and second leg portions carried in the mid portion of one member and receivable in a channel means carried in the other member, a guide structure and following structure respectively carried by the body and frame members at the edge portions thereof, operative to position the edge portions relative to one another as the leg portions are received in the channel means, and adhesive reservoir means provided on one of the guide and following structures wherein adhesive may be received to enable the other structure to be bonded to it as the edge portions are positioned and provide a joint between the members that is adapted to transfer and distribute loads encountered by the members throughout the assembly.

2. The invention defined in claim 1 wherein another adhesive reservoir means is formed by the channel in which the leg portions are received.

3. The invention defined in claim 1 wherein the lower frame member is comprised of fiber reinforced plastic.

4. The invention defined in claim 1 wherein stop means is provided to limit movement of the following structure with respect to the guide structure.

5. The invention defined in claim 1 wherein first and second sets of guide and, following structures are provided with one such set being laterally spaced to each side of a fore-and-aft extending center line passing through the assembly.

6. The invention defined in claim 1 wherein the channel is U-shaped, extends fore-and-aft in the mid-portion of the frame member, and receives the first and second leg portions which are carried by the body member.

7. The invention defined in claim 6 wherein an adhesive reservoir means is provided by the U-shaped channel for bonding the leg portions in the channel.

8. The invention defined in claim 1 wherein the means for joining said members includes transversely extending and fore-and-aft spaced first, second and third surfaces carried at forward portions of said frame member, the surfaces including spacer bump means for receiving and regulating adhesive volume.

9. The invention defined in claim 1 wherein additional means for positioning and joining the body and frame members includes a pair of generally vertically extending and abuttable body and lower frame member surfaces, one pair being laterally spaced to each side of a fore-and-aft center line extending through said vehicle assembly.

10. The invention defined in claim 9 wherein there is further provided in one of the body and lower frame members a notch and in the other a slot for aligning their relative fore-and-aft positions.

11. The invention defined in claim 1 wherein the upper body member is comprised of two plastic body portions bonded together along a generally centered and fore-and-aft extending line joint.

12. The invention defined in claim 11 wherein the body portions include an upstanding hollow steering column structure.

13. The invention defined in claim 12 wherein the steering column structure is comprised of two portions having overlapping and abutting tab structures bonded together.

14. Means for positioning a plastic upper body member relative to a fiber reinforced plastic lower frame member and for joining the members together to form a plastic monocoque vehicle assembly, said means including:

first and second laterally spaced apart and substantially V-shaped guide means carried by the body member for receiving first and second laterally spaced apart and substantially V-shaped following means carried by the frame member, the guide and following means each having first and second leg members;

first and second stop means for limiting movement of the following means relative to the guide means;

first and second generally transversely extending surfaces carried by the members, the surfaces being engagable with one another as the guide means receives the following means whereby fore-and-aft alignment of the members can be determined; and adhesive reservoir means carried on one of the guide and following means, said reservoir means enabling the guide and following means to be bonded together after the following means is received by the guide means to provide a joint adapted to transfer and distribute loads encountered by the members throughout the assembly.

15. The invention defined in claim 14 wherein there further provided a channel in one of the guide and following means, wherein adhesive can be received to bond said guide and following means together.

16. The invention defined in claim 14 wherein an adhesive reservoir is provided adjacent each stop means.

17. The invention defined in claim 14 wherein third and fourth pairs of laterally spaced apart guide and following means are carried on the body member above the first and second guide and following means.

18. The invention defined in claim 14 wherein a second adhesive reservoir means is carried on one of the members for bonding the first and second generally transversely extending surfaces together.

19. The invention defined in claim 18 wherein spacer bumps are provided on one of the first and second transversely extending surfaces for regulating adhesive receivable between the surfaces.

20. The invention defined in claim 14 wherein first and second pairs of generally transversely extending surfaces are provided on one of the members, said pairs being respectfully located at the rear and front portions of said assembly.

21. The invention defined in claim 14 wherein a notch is provided in one of the members and a slot is provided in the other of the members, the notch being receivable in the slot as the members are positioned to assist in locating their relative fore-and-aft positions.

22. The invention defined in claim 14 wherein a generally transverse lip is provided on one of the members, the lip being engagable with a transverse edge carried on the other member to assist in locating the relative fore-and-aft positions of said members.

23. Means for positioning a plastic upper body member relative to a plastic lower frame member and for joining the members together to form a plastic monocoque body assembly including:
   first and second guide and follower structures carried respectively by the members, each structure having a generally V-shaped cross sectional configuration with connected first and second leg members,
   the first and second leg members having elongated surfaces, that are complementarily configured to establish the relative lateral positions of the body and frame members as the elongated surfaces are joined;
   first and second generally transversely extending surfaces carried by the members, said transversely extending surfaces being engageable with one another as the elongated surfaces are engageably joined to establish the relative fore-and-aft positions of the body and frame members; and
   an adhesive reservoir means carried on one of said guide and follower structures to enable them to be bonded together as they are joined and provide a joint between the body and frame members that is adapted to transfer and distribute loads encountered by them throughout the assembly.

24. The invention defined in claim 23 wherein the elongated surfaces extend generally fore and aft with respect to a center line extending from the rear to the front of the assembly.

25. The invention defined in claim 23 wherein there are first and second pairs of first and second guide and follower structures, one pair being carried on each side of the members.

26. The invention described in claim 23 wherein stop means are provided on one of the first and second structures to limit sliding movement of one leg memeber with respect to the other structure.

27. Means for positioning an upper plastic body member relative to a plastic lower frame member and for joining the members together to form a plastic monocoque vehicle assembly including:
   first and second laterally spaced apart pairs of guide and follower structures carried respectively by the members, each structure having a generally v-shaped cross sectional configuration and connected first and second leg members;
   stop means carried on one of at least one pair of guide and follower structures to limit movement of the follower structure with respect to the guide structure as they are engaged and laterally position the body and frame members relative to one another;
   first and second generally transversely extending surfaces carried by the members, said transversely extending surfaces being engagable with one another as movement of the follower structure is limited by the guide structure whereby fore-and-aft alignment of members is determined; and
   adhesive reservoir means carried on one of each pair of guide and follower structures, to enable them to be bonded together as they are joined to provide a joint that permits loads encountered by the members to be transferred and distributed throughout the assembly.

28. The invention defined in claim 27 wherein the frame member is fiber reinforced plastic and locking means is provided, including a yieldable edge carried by the body member which is releasably engageable with a latch means carried by the frame member.

29. The invention defined in claim 27 wherein the frame member is comprised of a fiber reinforced plastic material.

30. The invention defined in claim 27 wherein one pair of guide and follower structures are flat and elongated, extending along a fore-and-aft line relative to said vehicle assembly.

31. The invention defined in claim 30 wherein the flat and elongated structures are inclined downwardly and inwardly with respect to the center of said vehicle.

32. The invention defined in claim 27 wherein the stop means is carried by one of the guide structures.

33. The invention defined in claim 27 wherein said first and second generally transversely extending surfaces are provided with adhesive reservoir means for bonding them together.

34. The invention defined in claim 27 wherein one pair of first and second transversely extending surfaces are provided at the rear and another pair is provided at the front portion of the assembly.

35. The invention defined in claim 27 wherein notch and slot means are provided respectively in one of the members for assisting in positioning the relative fore-and-aft locations of the members.

36. The invention defined in claim 27 wherein a generally transverse lip is provided on one member, said lip being engageable with a generally transversely extending ledge provided on the other member whereby the relative fore-and-aft positions of the members is established.

37. The invention defined in claim 1 wherein complementary adhesive receiving surfaces are carried by the members adjacent the channel means with spacer bumps being provided to regulate the adhesive receivable between the complementary surfaces.

* * * * *

UNITED STATES PATENT AND TRADEMARK OFFICE
CERTIFICATE OF CORRECTION

PATENT NO. : 5,314,230
DATED : May 24, 1994
INVENTOR(S) : WAYNE R. HUTCHISON ET AL.

It is certified that error appears in the above-indentified patent and that said Letters Patent is hereby corrected as shown below:

Column 6, line 24, delete "line".

Signed and Sealed this

First Day of November, 1994

BRUCE LEHMAN

Attest:

Attesting Officer

Commissioner of Patents and Trademarks